(12) United States Patent
Tsunenishi

(10) Patent No.: US 10,830,381 B2
(45) Date of Patent: Nov. 10, 2020

(54) HOSE RUBBER COMPOSITION AND HOSE

(71) Applicant: BRIDGESTONE CORPORATION, Tokyo (JP)

(72) Inventor: Youhei Tsunenishi, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 314 days.

(21) Appl. No.: 15/572,856

(22) PCT Filed: Jun. 3, 2016

(86) PCT No.: PCT/JP2016/002699
§ 371 (c)(1),
(2) Date: Nov. 9, 2017

(87) PCT Pub. No.: WO2016/199387
PCT Pub. Date: Dec. 15, 2016

(65) Prior Publication Data
US 2018/0142090 A1      May 24, 2018

(30) Foreign Application Priority Data

Jun. 9, 2015  (JP) .................................. 2015-117005

(51) Int. Cl.
*F16L 11/04* (2006.01)
*B32B 1/08* (2006.01)
(Continued)

(52) U.S. Cl.
CPC ................ *F16L 11/04* (2013.01); *B32B 1/08* (2013.01); *B32B 25/16* (2013.01); *C08K 3/04* (2013.01);
(Continued)

(58) Field of Classification Search
CPC .... B32B 1/08; C08K 3/04; C08K 3/36; C08L 9/00; C08L 9/06; C08L 11/00; C08L 11/02; F16L 11/00; F16L 11/04; F16L 11/045

See application file for complete search history.

(56) References Cited

U.S. PATENT DOCUMENTS

| 4,905,736 A | 3/1990 | Kitami et al. |
| 2005/0009979 A1* | 1/2005 | Tanaka .................... C08C 19/25 524/492 |

(Continued)

FOREIGN PATENT DOCUMENTS

| CN | 103415567 A | 11/2013 |
| CN | 103946300 A | 7/2014 |

(Continued)

OTHER PUBLICATIONS

Communication dated Mar. 22, 2018, from the European Patent Office in counterpart European Application No. 16807097.7.

(Continued)

*Primary Examiner* — Walter Aughenbaugh
(74) *Attorney, Agent, or Firm* — Sughrue Mion, PLLC

(57) ABSTRACT

This disclosure aims to provide a hose rubber composition capable of ensuring the flame retardance and simultaneously achieving both the tear resistance and the flexibility after vulcanization. The hose rubber composition of this disclosure comprises a rubber component and a carbon black, wherein: a chloroprene rubber is contained at an amount of 60 parts by mass or more in 100 parts by mass of the rubber component; the carbon black is compounded at an amount of more than 30 parts by mass and less than 80 parts by mass per 100 parts by mass of the rubber component; and the carbon black contains 13 mass % or more of a specific (Continued)

carbon black having an iodine adsorption of 100 to 160 mg/g and a DBP oil absorption of 70 to 180 mL/100 g.

15 Claims, 1 Drawing Sheet

(51) Int. Cl.
    *C08K 3/04*     (2006.01)
    *C08K 3/36*     (2006.01)
    *C08L 9/06*     (2006.01)
    *B32B 25/16*     (2006.01)
    *C08L 91/00*     (2006.01)
    *F16L 11/00*     (2006.01)
    *C08L 11/00*     (2006.01)
    *C08K 5/00*     (2006.01)
    *F16L 11/08*     (2006.01)

(52) U.S. Cl.
    CPC .............. *C08K 3/36* (2013.01); *C08K 5/0016* (2013.01); *C08L 9/06* (2013.01); *C08L 11/00* (2013.01); *C08L 91/00* (2013.01); *F16L 11/00* (2013.01); *F16L 11/045* (2013.01); *C08K 2201/006* (2013.01); *F16L 11/08* (2013.01)

(56) References Cited

U.S. PATENT DOCUMENTS

| | | |
|---|---|---|
| 2011/0262573 A1 | 10/2011 | Tanno et al. |
| 2012/0232208 A1* | 9/2012 | Saito .................. C08K 3/04 524/493 |
| 2013/0344269 A1 | 12/2013 | Abe et al. |
| 2014/0329035 A1 | 11/2014 | Tsunenishi |
| 2015/0183970 A1* | 7/2015 | Miyamoto ............ F16L 11/082 138/138 |

FOREIGN PATENT DOCUMENTS

| | | |
|---|---|---|
| EP | 2 189 498 A1 | 5/2010 |
| EP | 2837478 A1 | 2/2015 |
| JP | 63-302037 A | 12/1988 |
| JP | 10-267169 A | 10/1998 |
| JP | 2003-105131 A | 4/2003 |
| JP | 2010-121006 A | 6/2010 |
| JP | 2011-224945 A | 11/2011 |
| JP | 2012-184315 A | 9/2012 |
| JP | 2013-122018 A | 6/2013 |
| JP | 2013-171711 A | 9/2013 |
| JP | 2014-009333 A | 1/2014 |
| WO | 2009/035109 A1 | 3/2009 |
| WO | 2014/007220 A1 | 1/2014 |
| WO | 2014/188676 A1 | 11/2014 |

OTHER PUBLICATIONS

K. Gouda, "Gouseigomukakougijyutuzennsyo (Compendium of Synthetic Rubber Processing Technologies)", vol. 6, Chloroprene Rubber, Taiseisha Co., Ltd., 1972, pp. 26, 60 (total 5 pages), Partial translation.
"Carbon Black Year Book", Carbon Black Association, 2017, No. 67, p. 64 (total 4 pages), Partial Translation.
Search Report dated Jul. 2, 2019 issue by the China National Intellectual Property Administration in counterpart Chinese Application No. 201680033625.5, Translation.
International Search Report of PCT/JP2016/002699 dated Jul. 12, 2016 [PCT/ISA/210], English Translation.

* cited by examiner

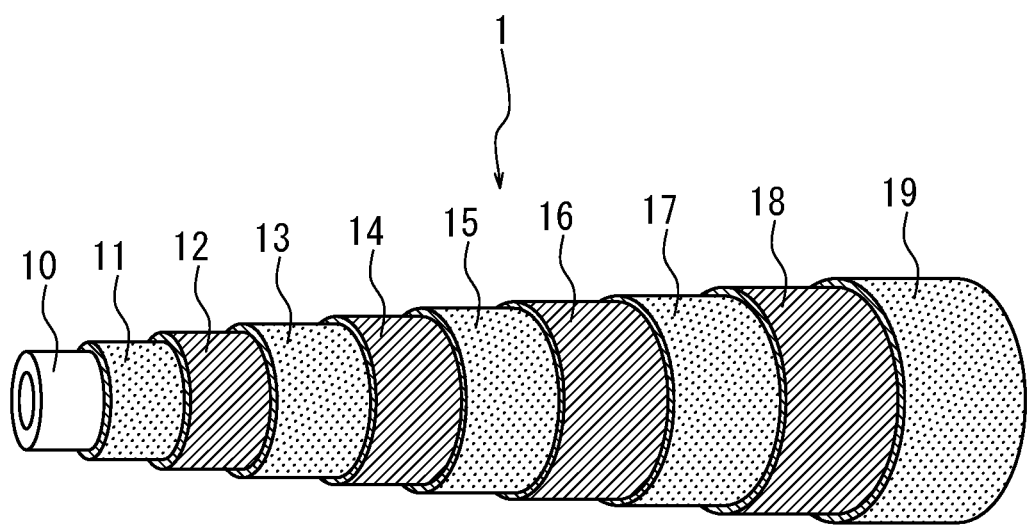

HOSE RUBBER COMPOSITION AND HOSE

CROSS REFERENCE TO RELATED APPLICATIONS

This application is a National Stage of International Application No. PCT/JP2016/002699, filed Jun. 3, 2016, claiming priority based on Japanese Patent Application No. 2015-117005, filed Jun. 9, 2015, the contents of all of which are incorporated herein by reference in their entirety.

TECHNICAL FIELD

This disclosure relates to a hose rubber composition and a hose.

BACKGROUND

Research has been conventionally conducted to improve the weather resistance, fatigue resistance, abrasion resistance, etc. of hydraulic hoses used in construction machines and the like (for example, see Patent Literature (PTL) 1).

Hydraulic hoses have been increasingly used in mines such as coal mines in recent years, and required to have improved flame retardance for safety during work. For example, flame retardance required of hydraulic hoses is mainly defined by the MSHA (Mine Safety and Health Administration) standard in the United States.

Moreover, with the use of very large hydraulic excavator in recent years, large-diameter high-pressure hoses have been increasingly used in harsher use environments. This has created the tendency to demand hoses with high pressure resistance and long life.

Conventional flame-retardant outer cover rubber is, however, not suitable for long-term use, as an increase in bending stress due to large diameter may cause an outer cover crack after long-term use.

Regarding a chlorinated polymer such as chloroprene rubber from which vulcanized rubber used in automobile rubber members, hoses, rubber molded objects, and rubber vibration isolators is obtained, research has been conducted to further improve heat resistance without impairing mechanical properties, compression set, and elongation fatigue performance (for example, see PTL 2).

However, a rubber capable of ensuring the flame retardance and simultaneously achieving both the tear resistance and the flexibility after vulcanization has not been attained, of which development is strongly desired.

CITATION LIST

Patent Literature

PTL1: JP2010-121006A
PTL2: WO2009/035109A1

SUMMARY

Technical Problem

Then, this disclosure aims to provide a hose rubber composition capable of ensuring the flame retardance and simultaneously achieving both the tear resistance and the flexibility after vulcanization. Moreover, this disclosure aims to provide a hose capable of ensuring the flame retardance and simultaneously achieving both the tear resistance and the flexibility.

Solution to Problem

The hose rubber composition of this disclosure comprises a rubber component and a carbon black, wherein: a chloroprene rubber (CR) is contained at an amount of 60 parts by mass or more in 100 parts by mass of the rubber component; the carbon black is compounded at an amount of more than 30 parts by mass and less than 80 parts by mass per 100 parts by mass of the rubber component; and the carbon black contains 13 mass % or more of a specific carbon black having an iodine adsorption of 100 to 160 mg/g and a DBP oil absorption of 70 to 180 mL/100 g.

Advantageous Effect

According to this disclosure, it is possible to provide a hose rubber composition capable of ensuring the flame retardance and simultaneously achieving both the tear resistance and the flexibility after vulcanization. Moreover, according to this disclosure, it is possible to provide a hose capable of ensuring the flame retardance and simultaneously achieving both the tear resistance and the flexibility after vulcanization.

BRIEF DESCRIPTION OF THE DRAWINGS

FIG. 1 illustrates a perspective view of an example of a laminate structure of a hose of an embodiment according to this disclosure, which uses a hose rubber composition of an embodiment according to this disclosure.

DETAILED DESCRIPTION (Hose Rubber Composition)

Hereinafter, the hose rubber composition of this disclosure is described in details based on its embodiment.

The disclosed hose rubber composition includes at least a rubber component and a carbon black, and further includes silica, a plasticizer component and other components when necessary.

<Rubber Component>

The rubber component at least contains a chloroprene rubber (CR), and further contains a styrene-butadiene rubber (SBR), a butadiene rubber (BR) or another polymer when necessary.

In the hose rubber composition of this disclosure, it is preferable that the rubber component further contains at least any one of a styrene-butadiene rubber and a butadiene rubber. According to this configuration, it is possible to avoid deterioration of the abrasion resistance of the hose rubber composition, or it is possible to improve the processability (the dimensional stability of extrusion and the extruded surface characteristics).

<<Chloroprene Rubber (CR)>>

The content of the chloroprene rubber (CR) is not particularly limited as long as it is 60 parts by mass or more in 100 parts by mass of the rubber component, and may be selected as appropriate depending on the purpose. The content of the chloroprene rubber (CR) is preferably 70 parts to 90 parts by mass, and more preferably 75 parts to 85 parts by mass in 100 parts by mass of the rubber component.

If the content of the chloroprene rubber (CR) is less than 60 parts by mass in 100 parts by mass of the rubber component, the flame retardance cannot be ensured. The content of the chloroprene rubber within the aforementioned preferable range or more preferable range is advantageous from the viewpoint of the flame retardance and the processability.

In the hose rubber composition of this disclosure, it is preferable that the chloroprene rubber is contained at an amount of 70 parts by mass or more in 100 parts by mass of the rubber component. According to this configuration, it is possible to ensure the flame retardance more securely.

The chloroprene rubber (CR) is a homopolymer (chloroprene polymer) of a chloroprene monomer or a copolymer (hereinafter referred to as the chloroprene-based copolymer) obtained by polymerizing a mixture of a chloroprene monomer and at least one type of other monomer copolymerizable with the chloroprene monomer (hereinafter referred to as the chloroprene-based monomer).

—Classification of Chloroprene Rubber—

The chloroprene rubber is classified as sulfur-modified type, mercaptan-modified type, or xanthogen-modified type, according to the type of a molecular weight regulator.

The chloroprene rubber may be any of the modified types. The sulfur-modified type is, however, lower in heat resistance of the polymer itself than the mercaptan-modified type and the xanthogen-modified type, and accordingly the mercaptan-modified type or the xanthogen-modified type is preferably used in the case where higher heat resistance is required.

——Sulfur-Modified Type——

The sulfur-modified type is a type that plasticizes, with thiuram disulfide, a polymer which is the result of copolymerizing sulfur and the chloroprene monomer or the chloroprene-based monomer, and adjusts it to predetermined Mooney viscosity.

——Mercaptan-Modified Type——

The mercaptan-modified type is a type that uses alkylmercaptan such as n-dodecylmercaptan, tert-dodecylmercaptan, or octylmercaptan as a molecular weight regulator.

——Xanthogen-Modified Type——

The xanthogen-modified type uses an alkylxanthogen compound as a molecular weight regulator. The alkylxanthogen compound is not particularly limited, and may be selected as appropriate depending on the purpose. Examples include dimethylxanthogen disulfide, diethylxanthogen disulfide, diisopropylxanthogen disulfide, and diisobutylxanthogen disulfide. These may be used singly or in a combination of two or more.

The amount of the alkylxanthogen compound used is not particularly limited as long as the molecular weight (or Mooney viscosity) of the chloroprene rubber is proper, and may be selected as appropriate depending on the purpose (the structure of the alkyl group or the target molecular weight). The amount of the alkylxanthogen compound used is preferably 0.05 parts to 5.0 parts by mass and more preferably 0.3 parts to 1.0 parts by mass per 100 parts by mass of the chloroprene monomer or the chloroprene-based monomer.

—Content of Chloroprene Rubber (CR)—

The content of the chloroprene rubber (CR) is not particularly limited as long as it is 60 parts by mass or more in 100 parts by mass of the rubber component, and may be selected as appropriate depending on the purpose. The content of the chloroprene rubber (CR) is preferably 70 parts by mass or more, more preferably 70 parts to 90 parts by mass, and particularly preferably 75 parts to 85 parts by mass in 100 parts by mass of the rubber component.

The content of the chloroprene rubber (CR) of 70 parts by mass or more in 100 parts by mass of the rubber component is advantageous from the viewpoint of the flame retardance. The content of the chloroprene rubber (CR) within the aforementioned more preferable range or particularly preferable range is more advantageous from the viewpoint of the flame retardance, the processability (shelf stability), the oil resistance and the weather resistance.

<<Styrene-Butadiene Rubber (SBR)>>

The styrene-butadiene rubber (SBR) is a copolymer (styrene-butadiene copolymer) of a styrene monomer and a butadiene monomer, or a copolymer (hereafter referred to as a styrene-butadiene-based copolymer) obtained by polymerizing a mixture (hereafter referred to as a styrene-butadiene-based monomer) of a styrene monomer, a butadiene monomer, and at least one type of other monomer copolymerizable with the styrene monomer and the butadiene monomer.

By compounding the styrene-butadiene rubber (SBR), it is possible to avoid deterioration of the abrasion resistance of the hose rubber composition, and to simultaneously improve the processability (the dimensional stability of extrusion and the extruded surface characteristics).

—Monomer Copolymerizable with Styrene Monomer and Butadiene Monomer—

The monomer copolymerizable with the styrene monomer and the butadiene monomer is not particularly limited, and may be selected as appropriate depending on the purpose. Examples include: conjugated diene monomers having 5 to 8 carbon atoms such as 2-methyl-1,3-butadiene, 2,3-dimethyl-1,3-butadiene, 1,3-pentadiene, and 1,3-hexadiene; and aromatic vinyl monomers such as p-methylstyrene, α-methylstyrene, and vinylnaphthalene. These may be used singly or in a combination of two or more.

—Styrene Content of Styrene-Butadiene Rubber (SBR)—

The styrene content of the styrene-butadiene rubber (SBR) is not particularly limited, and may be selected as appropriate depending on the purpose. The styrene content of the styrene-butadiene rubber (SBR) is preferably 20% to 45% by mass, and more preferably 20% to 35% by mass.

When the styrene content of the styrene-butadiene rubber (SBR) is 20% by mass or more, sufficient effect of preventing a decrease in processability may be attained. When the styrene content of the styrene-butadiene rubber (SBR) is 45% by mass or less, sufficient effect of preventing a decrease in abrasion resistance may be attained. On the other hand, the styrene content of the styrene-butadiene rubber (SBR) within the more preferable range is more advantageous from the viewpoint of the processability and the abrasion resistance.

—Content of Styrene-Butadiene Rubber (SBR)—

The content of the styrene-butadiene rubber (SBR) is not particularly limited, and may be selected as appropriate depending on the purpose as long as it is 40 parts by mass or less in 100 parts by mass of the rubber component. The content of the styrene-butadiene rubber (SBR) is preferably 10 parts to 40 parts by mass.

If the content of the styrene-butadiene rubber (SBR) is more than 40 parts by mass in 100 parts by mass of the rubber component, the ratio of the chlorinated polymer is reduced, which deteriorates the flame retardance. On the other hand, the content of the styrene-butadiene rubber (SBR) within the preferable range is more advantageous from the viewpoint of the flame retardance, the abrasion resistance and the processability (the stability of extrusion and the extruded surface characteristics).

<<Butadiene Rubber (BR)>>

The butadiene rubber (BR) is a homopolymer of a butadiene monomer (butadiene polymer) or a copolymer (hereinafter referred to as the butadiene-based copolymer)

obtained by polymerizing a mixture of a butadiene monomer and at least one type of other monomer copolymerizable with the butadiene monomer (hereinafter referred to as the butadiene-based monomer). The butadiene rubber (BR) may be terminal-modified.

By compounding the butadiene rubber (BR), it is possible to improve the abrasion resistance.

—Cis-1,4 Bond Content of Butadiene Rubber (BR)—

The cis-1,4 bond content of the butadiene rubber (BR) is not particularly limited, and may be selected as appropriate depending on the purpose. The cis-1,4 bond content is preferably 90% or more, more preferably 93% or more, and particularly preferably 95% or more.

If the butadiene rubber has a cis-1,4 bond content of less than 90% and is not terminal-modified, there are cases where the abrasion resistance improvement effect cannot be attained sufficiently. On the other hand, the cis-1,4 bond content within the more preferable range or a terminal-modified BR even if the cis-1,4 bond content is less than 90% is advantageous from the viewpoint of the abrasion resistance, more advantageous if within the particularly preferable range.

Note that the cis-1,4 bond content may be measured by using $^1$H-NMR, $^{13}$C-NMR, FT-IR, etc.

—Content of Butadiene Rubber (BR)—

The content of the butadiene rubber (BR) is not particularly limited, and may be selected as appropriate depending on the purpose as long as it is 40 parts by mass or less in 100 parts by mass of the rubber component. The content of the butadiene rubber (BR) is preferably 10 parts to 40 parts by mass.

If the content of the butadiene rubber (BR) is more than 40 parts by mass in 100 parts by mass of the rubber component, the ratio of the chloroprene rubber (CR) is reduced, which deteriorates the flame retardance. On the other hand, the content of the butadiene rubber (BR) within the aforementioned preferable range is advantageous from the viewpoint of the flame retardance and the abrasion resistance.

<<Other Polymers>>

The other polymer is not particularly limited, and may be selected as appropriate depending on the purpose. Examples include natural rubber (NR), butyl rubber (IIR), chlorosulfonated polyethylene (CSM), chlorinated polyethylene (CPE), acrylonitrile butadiene rubber (NBR), hydrogenated acrylonitrile-butadiene rubber (H-NBR), acrylic rubber (ACM), ethylene-propylene rubber (EPDM), epichlorohydrin rubber (CO), hydrin rubber (ECO), silicone rubber (Q), fluororubber (FKM), polyvinyl chloride (PVC), blend rubber of polyvinyl chloride (PVC) and acrylonitrile butadiene rubber (NBR) (NV) (corresponding to "a mixture of polyvinyl chloride and acrylonitrile butadiene rubber"), and chlorinated natural rubber. These may be used singly or in a combination of two or more.

Of these, CSM and CPE are preferable from the viewpoint of flame retardance.

<Carbon Black>

The carbon black can ensure the reinforcement performance, the flame retardance, the flexibility and the tear resistance by being compounded at a specific amount to the rubber component.

The carbon black contains a specific carbon black at a predetermined amount.

—Compounding Amount of Carbon Black—

The content of the carbon black is not particularly limited as long as it is more than 30 parts and less than 80 parts by mass per 100 parts by mass of the rubber component, and may be selected as appropriate depending on the purpose. The content of the carbon black is preferably 40 parts to 70 parts by mass per 100 parts by mass of the rubber component.

If the compounding amount of the carbon black is 30 parts by mass or less per 100 parts by mass of the rubber component, the dimensional stability during extrusion cannot be ensured, and if 80 parts by mass or more, the initial elongation (crack resistance) cannot be improved. On the other hand, the compounding amount of the carbon black within the preferable range is advantageous from the viewpoint of the flame retardance, the dimensional stability and the flexibility.

The carbon black is not specifically limited and may be appropriately selected depending on the purpose. The carbon black is preferably: (i) a mixture of a carbon black of FEF class (iodine adsorption of 40 to 60 mg/g (g/kg), DBP oil absorption of 100 to 130 mL/100 g ($100 \times 10^{-5}$ m$^3$/kg to $130 \times 10^{-5}$ m$^3$/kg)) and a carbon black of ISAF class (iodine adsorption of 110 mg/g to 130 mg/g (g/kg), DBP oil absorption of 90 mL/100 g to 140 mL/100 g ($90 \times 10^{-5}$ m$^3$/kg to $140 \times 10^{-5}$ m$^3$/kg)); or (ii) a mixture of a first carbon black having an iodine adsorption of 20 mg/g to 100 mg/g and a DBP oil absorption of 50 mL/100 g to 150 mL/100 g and a second carbon black having an iodine adsorption of 100 mg/g to 160 mg/g and a DBP oil absorption of 70 mL/100 g to 180 mL/100 g, where a content of the first carbon black per 100 parts by mass of the rubber component is 0 parts to 55 parts by mass and a content of the second carbon black per 100 parts by mass of the rubber component is 10 parts to 65 parts by mass. Thereby, it is possible to ensure the flame retardance more securely, and simultaneously achieve both the tear resistance and the flexibility.

In the hose rubber composition of this disclosure, it is preferable that the carbon black contains a carbon black of FEF class and a carbon black of ISAF class. According to this configuration, it is possible to ensure the resistance to crack propagation (the tear resistance) more securely.

—Specific Carbon Black—

The "specific carbon black" refers to a carbon black having an iodine adsorption of 100 mg/g to 160 mg/g and a DBP oil absorption of 70 mL/100 g to 180 mL/100 g.

The iodine adsorption of the specific carbon black is not specifically limited and may be appropriately selected depending on the purpose as long as it is 100 to 160 mg/g. The iodine adsorption of the specific carbon black is preferably 110 mg/g to 150 mg/g, more preferably 110 mg/g to 130 mg/g.

If the iodine adsorption of the specific carbon black is less than 100 mg/g, the tear resistance cannot be attained sufficiently, and if more than 160 mg/g, the flexibility would be deteriorated. The aforementioned preferable range is advantageous from the viewpoint of the balance among the abrasion resistance, the processability, the flexibility and the tear resistance, and the aforementioned more preferable range is more advantageous.

The DBP oil absorption of the specific carbon black is not specifically limited within the range of 70 mL/100 g to 180 mL/100 g, and may be appropriately selected depending on the purpose. The DBP oil absorption of the specific carbon black is preferably 90 mL/100 g to 150 mL/100 g, more preferably 100 mL/100 g to 140 mL/100 g.

If the DBP oil absorption of the specific carbon black is less than 70 mL/100 g, the tear resistance cannot be attained sufficiently, and if more than 180 mL/100 g, the flexibility would be deteriorated. The aforementioned preferable range is advantageous from the viewpoint of the balance among the abrasion resistance, the processability, the flexibility and the tear resistance, and the aforementioned more preferable range is more advantageous.

It is preferable that the specific carbon black has an iodine adsorption of 110 mg/g to 150 mg/g and a DBP oil absorption of 90 mL/100 g to 150 mL/100 g, and it is more preferable that the specific carbon black has an iodine adsorption of 110 mg/g to 130 mg/g and a DBP oil absorption of 100 mL/100 g to 140 mL/100 g.

The iodine adsorption and the DBP oil absorption of the specific carbon black within the aforementioned preferable range is advantageous from the viewpoint of the balance among the abrasion resistance, the processability, the flexibility and the tear resistance, and more advantageous within the more preferable range.

—Content of Specific Carbon Black—

The content of the specific carbon black in the carbon black is not specifically limited may be appropriately selected depending on the purpose as long as it is 13 mass % or more. The content of the specific carbon black in the carbon black is preferably 30 mass % to 80 mass %.

If the content is less than 13 mass %, the tear resistance cannot be attained sufficiently. On the other hand, the content within the aforementioned preferable range is advantageous from the viewpoint of the capability of achieving both the tear resistance and the flexibility more securely.

<Silica>

By compounding the silica to the rubber component, it is possible to improve the flame retardance (in particular, shortens afterglow response), to improve the processability (the dimensional stability of extrusion and the extruded surface characteristics), and to maintain the abrasion resistance.

The nitrogen adsorption specific surface area ($N_2SA$) of the silica is not particularly limited, and may be selected as appropriate depending on the purpose. The nitrogen adsorption specific surface area ($N_2SA$) of the silica is preferably 70 $m^2$/g to 300 $m^2$/g, more preferably 100 $m^2$/g to 280 $m^2$/g, and particularly preferably 150 $m^2$/g to 250 $m^2$/g.

If the nitrogen adsorption specific surface area ($N_2SA$) of the silica is 70 $m^2$/g or more, it is possible to attain sufficient effect of improvement of the flame retardance and the abrasion resistance, and if 300 $m^2$/g or less, it is possible to attain sufficient effect of improvement of the dispersibility and the processability. On the other hand, the nitrogen adsorption specific surface area ($N_2SA$) of the silica within the more preferable range is advantageous from the viewpoint of the balance among the flame retardance, the abrasion resistance, the dispersibility and the processability, more advantageous within the particularly preferable range.

—Compounding Amount of Silica—

The content of the silica is not particularly limited, and may be selected as appropriate depending on the purpose. The content of the silica is preferably 5 parts to 25 parts by mass and more preferably 15 parts to 25 parts by mass per 100 parts by mass of the rubber component.

If the compounding amount of the silica is 5 parts by mass or more, it is possible to improve the flame retardance (in particular, shortens the afterglow response), and if 25 parts by mass or less, it is possible to avoid excessive hardening. On the other hand, the content of the silica within the above-mentioned more preferable range is advantageous from the viewpoint of the flame retardance and the processability (the dimensional stability of extrusion and the extruded surface characteristics), in the compounding ratio of each component.

In the hose rubber composition of this disclosure, it is further preferable that the silica is compounded at an amount of 5 parts to 25 parts by mass per 100 parts by mass of the rubber component. According to this configuration, it is possible to improve the flame retardance (in particular, shortens afterglow response), and to improve the processability (the dimensional stability of extrusion and the extruded surface characteristics).

<Plasticizer>

By compounding the plasticizer to the rubber component, it is possible to improve the initial elongation (the flexibility and even the crack resistance).

The plasticizer is not particularly limited, and may be selected as appropriate depending on the purpose. Examples include paraffin-based oil, aroma-based oil, naphthene-based oil, and ester-based oil. These may be used singly or in a combination of two or more.

A mixture of spindle oil (mainly containing paraffin-based oil) and aroma oil (mainly containing aroma-based oil) is particularly preferable. The mix ratio of the mixture of the spindle oil and the aroma oil (the mass of the spindle oil/the mass of the aroma oil) is not particularly limited, and may be selected as appropriate depending on the purpose. The mix ratio is preferably 1/2 to 1/1.

When the mix ratio is 1/2 or more, it is possible to attain sufficient effect of preventing an increase in tackiness during work. When the mix ratio is 1/1 or less, it is possible to avoid deterioration of the flame retardance.

—Compounding Amount of Plasticizer—

The compounding amount of the plasticizer is not specifically limited and may be selected as appropriate depending on the purpose. The compounding amount of the plasticizer is preferably 20 parts by mass or less, more preferably 5 parts to 20 parts by mass, particularly preferably 10 to 15 parts by mass per 100 parts by mass of the rubber component.

Even if the plasticizer is compounded, if the compounding amount of the plasticizer is 20 parts by mass or less per 100 parts by mass of the rubber component, it is possible to avoid deterioration of the flame retardance. On the other hand, the compounding amount of the plasticizer within the aforementioned more preferable range is advantageous from the viewpoint of the balance among the flame retardance, the initial elongation (the flexibility and even the crack resistance) and the processability, more advantageous within the particularly preferable range.

In the hose rubber composition of this disclosure, it is further preferable that the plasticizer is compounded at an amount of 20 parts by mass or less per 100 parts by mass of the rubber component. According to this configuration, it is possible to ensure the flame retardance, and further improve the flexibility.

<Other Components>

As the other components, compounding ingredients generally used in the rubber industry such as inorganic fillers other than the carbon black and the silica such as talc, clay, calcium carbonate and the like; vulcanizing agents such as peroxide vulcanizing agent and the like; vulcanization accelerators; vulcanization accelerator aids such as zinc oxide, stearic acid and the like; vulcanization retardants; age resistors; waxes; anti-scorch agents; softeners; adhesive aids such as silane coupling agent, organic acid salt (organic acid cobalt salt, etc.), resorcin, hexamethylenetetramine, melamine resin and the like; and metal compounds such as magnesium oxide, calcium oxide, calcium carbonate, aluminum hydroxide, magnesium hydroxide and the like may be selected as appropriate and compounded in a range not impairing the object of the disclosure. These compounding ingredients are preferably commercially available ones.

Note that the rubber composition can be manufactured by kneading, warming, extrusion, etc., with various compounding ingredients selected as appropriate when necessary compounded to a necessary component containing the rubber component and the carbon black.

(Hose)

The hose of this disclosure includes at least a rubber layer, and further includes one or more layers other than the rubber layer and other members when necessary.

The hose of this disclosure has a rubber layer using the hose rubber composition of this disclosure.

According to the hose of this disclosure, it is possible to ensure the flame retardance, and to simultaneously achieve both the resistance to crack propagation (the tear resistance) and the flexibility.

—Rubber Layer—

The rubber layer is made of the hose rubber composition of this disclosure. The part of the hose to which the rubber layer is applied is not particularly limited, and may be selected as appropriate depending on the purpose. For example, the part may be an intermediate rubber layer not forming the inner or outer surface of the hose and/or an outer surface rubber layer (outer cover rubber layer) forming the outer surface of the hose. The rubber layer is particularly preferably the outer surface rubber layer.

The shape, structure, and size of the outer surface rubber layer are not particularly limited, and may be selected as appropriate depending on the purpose.

The thickness of the outer surface rubber layer is not particularly limited, and may be selected as appropriate depending on the purpose. The thickness of the outer surface rubber layer is preferably 0.3 mm to 3.5 mm, more preferably 0.7 mm to 3.2 mm, and particularly preferably 1.0 mm to 3.0 mm.

When the thickness of the outer rubber layer is 0.3 mm or more, it is possible to avoid shorter life caused by abrasion. When the thickness of the rubber layer is 3.5 mm or less, it is possible to avoid lower flame retardance caused by an increased amount of fuel component, and to avoid degradation of the flexibility, lightweight property, or space saving property of the hose. On the other hand, the thickness of the outer rubber layer within the above-mentioned more preferable range is advantageous from the viewpoint of flame retardance and abrasion life, and the thickness of the rubber layer within the above-mentioned particularly preferable range is more advantageous from the viewpoint of flame retardance and abrasion life.

An example of the laminate structure of the hose of an embodiment according to this disclosure is as illustrated in FIG. 1. In FIG. 1, the hose 1 is a hydraulic hose having an inner surface rubber layer 10, reinforcement layers 12, 14, 16, and 18 having brass-plated wires, intermediate rubber layers 11, 13, 15, and 17, and an outer surface rubber layer 19.

The hose rubber composition of this disclosure is preferably used at least to the outer surface rubber layer 19, and may also be used to all or a part of the intermediate rubber layers 11, 13, 15, 17 and the outer surface rubber layer 19.

Although the structure of the hose illustrated here is made up of a plurality of layers by arranging the inner surface rubber layer 10, the four reinforcement layers 12, 14, 16, and 18, the four intermediate rubber layers 11, 13, 15, and 17, and the outer surface rubber layer 19 from inside, this is not a limitation. For example, the hose may have a three-layer structure in which an inner surface rubber layer, a reinforcement layer, and an outer surface rubber layer are stacked in order. The structure of the hose may be selected as appropriate depending on the required characteristics of the hose. Besides, the reinforcement layers need not be all made of brass-plated wires, and part of the reinforcement layers may be made of organic fibers. The hose may have a resin layer such as ultra high molecular weight polyethylene in its outermost layer to improve the abrasion resistance.

<Method of Manufacturing Hose>

The method of manufacturing the hose of this disclosure includes, for example, the following inner tube extrusion step, wrapping step, outer cover extrusion step, resin mold coating step, vulcanization step, resin mold peeling step, and mandrel removal step, and further includes other steps selected as appropriate when necessary.

To exemplify with a hose with the structure of FIG. 1, first, a rubber composition for the inner surface rubber layer 10 is extruded onto the outside of a core body (mandrel) whose diameter is substantially the same as the hose inner diameter to coat the mandrel, thus forming the inner surface rubber layer 10 (inner tube extrusion step). A layer made of organic fibers may be introduced on the inner tube rubber layer 10, to prevent irregular winding when braiding wires. Next, a predetermined number of brass-plated wires are braided on the outside of the inner surface rubber layer 10 formed in the inner tube extrusion step to form the reinforcement layer 12 (braiding step), and a sheet of the hose rubber composition of this disclosure is inserted inside the reinforcement layer 12 to form the intermediate rubber layer 11. This is repeated a plurality of times to stack the reinforcement layers 14, 16, and 18 and the intermediate rubber layers 13, 15, and 17 in sequence. The outer surface rubber layer 19 made of the hose rubber composition of this disclosure is then formed (outer cover extrusion step). The outside of the outer surface rubber layer 19 formed in the outer cover extrusion step is coated with a suitable resin as appropriate (resin mold coating step), and the structure is vulcanized under predetermined conditions (vulcanization step). After the vulcanization, the coating resin is peeled away (resin mold peeling step), and the mandrel is removed (mandrel removal step). This produces the hose having the intermediate rubber layers 11, 13, 15, and 17 and the reinforcement layers 12, 14, 16, and 18 between the inner surface rubber layer 10 and the outer surface rubber layer 19.

INDUSTRIAL APPLICABILITY

The disclosed hose rubber composition is suitable for use in, for example, an intermediate rubber layer and/or outer surface rubber layer of a hydraulic hose of a hydraulic excavator used in a mine such as a coal mine.

REFERENCE SIGNS LIST 1 hose
10 inner surface rubber layer
11,13,15,17 intermediate rubber layer
12,14,16,18 reinforcement layer
19 outer surface rubber layer

The invention claimed is:

1. A hose comprising an inner surface rubber layer, an intermediate rubber layer and an outer surface rubber layer from inside, wherein the intermediate rubber layer and/or the outer surface rubber layer comprises a hose rubber composition comprising a rubber component, a carbon black and a silica, wherein:

a chloroprene rubber is contained at an amount of 60 parts by mass or more in 100 parts by mass of the rubber component;

the carbon black is compounded at an amount of more than 30 parts by mass and less than 80 parts by mass per 100 parts by mass of the rubber component;

the silica is compounded at an amount of 5 parts to 25 parts by mass per 100 parts by mass of the rubber component; and the carbon black contains 13 mass % or more of a specific carbon black having an iodine adsorption of 100 to 160 mg/g and a DBP oil absorption of 70 to 180 mL/100 g.

2. The hose according to claim 1, wherein:
the chloroprene rubber is contained at an amount of 70 parts by mass or more in 100 parts by mass of the rubber component.

3. The hose according to claim 1, wherein:
the carbon black contains a carbon black of FEF class and a carbon black of ISAF class.

4. The hose according to claim 1, wherein:
the rubber component further contains at least any one among a styrene-butadiene rubber and a butadiene rubber.

5. The hose according to claim 1, wherein:
a plasticizer is further compounded at an amount of 20 parts by mass or less per 100 parts by mass of the rubber component in the hose rubber composition.

6. The hose according to claim 2, wherein:
the carbon black contains a carbon black of FEF class and a carbon black of ISAF class.

7. The hose according to claim 2, wherein:
the rubber component further contains at least any one among a styrene-butadiene rubber and a butadiene rubber.

8. The hose according to claim 2, wherein:
a plasticizer is further compounded at an amount of 20 parts by mass or less per 100 parts by mass of the rubber component in the hose rubber composition.

9. The hose according to claim 3, wherein:
the rubber component further contains at least any one among a styrene-butadiene rubber and a butadiene rubber.

10. The hose according to claim 3, wherein:
a plasticizer is further compounded at an amount of 20 parts by mass or less per 100 parts by mass of the rubber component in the hose rubber composition.

11. The hose according to claim 4, wherein:
a plasticizer is further compounded at an amount of 20 parts by mass or less per 100 parts by mass of the rubber component in the hose rubber composition.

12. The hose according to claim 1, wherein the carbon black contains 30 mass % to 80 mass % of the specific carbon black having an iodine adsorption of 100 to 160 mg/g and a DBP oil absorption of 70 to 180 mL/100 g.

13. The hose according to claim 1, wherein a styrene-butadiene rubber is contained at an amount of 10 parts to 40 parts by mass in 100 parts by mass of the rubber component of the hose rubber composition.

14. The hose according to claim 1, wherein a butadiene rubber is contained at an amount of 10 parts to 40 parts by mass in 100 parts by mass of the rubber component of the hose rubber composition.

15. The hose according to claim 1, wherein a thickness of the outer surface rubber layer is 0.3 mm to 3.5 mm.

* * * * *